Feb. 2, 1932.　　　N. MEDVED　　　1,843,293

ROLLER BEARING

Filed Feb. 27, 1928　　2 Sheets-Sheet 1

Inventor
Nicholas Medved
By Freast and Bond
Attorneys

Patented Feb. 2, 1932

1,843,293

UNITED STATES PATENT OFFICE

NICHOLAS MEDVED, OF CANTON, OHIO

ROLLER BEARING

Application filed February 27, 1928. Serial No. 257,190.

My invention relates to roller bearings including an inner raceway sleeve, an outer raceway sleeve, and rollers interposed between and rolling on the raceways of the sleeves; and more particularly to roller bearings including tapered conical rollers, and for which the inner raceway sleeves are usually called the cones, and the outer raceway sleeves are usually called the cups.

In such roller bearings, operating difficulties have been encountered in absorbing direct and component thrust loads, there being a tendency for the ends of rollers subject to the thrust loads to be destroyed by the excessive friction between the roller ends and the usual shoulders employed on the cones to absorb the thrust of the tapered rollers.

A principal object of the present invention includes the provision of a roller bearing employing tapered rollers, and in which there is a substantial reduction in the friction resulting from the operation of the same, and more particularly from the friction resulting from direct and component thrust loads.

A further object of the present invention includes the provision of a roller bearing, the parts of which are adapted for easy and economical manufacture and assembly.

These and ancillary objects are attained in the improvements of the present invention, several embodiments of which are hereinafter set forth in detail, and which may be stated in general terms as comprising a roller bearing including a cone having one or more outer raceway surfaces, a cup having one or more inner raceway surfaces and tapered rollers interposed between and rolling on the raceway surfaces of the cone and cup, each raceway surface being limited to a conical surface, and means independent of the cone and cup positively maintaining the circumferential and longitudinal axial positions of the rollers with respect to each other and providing novel bearings mounting the ends of each roller for rotation of the roller thereon about the longitudinal axis of the roller, and, under no load conditions, one of the conical raceway surfaces contacting only with end portions of the conical surfaces of the tapered rollers; and the present improvements also include details of construction and arrangement of roller bearing parts, as hereinafter exemplified.

Figure 3:
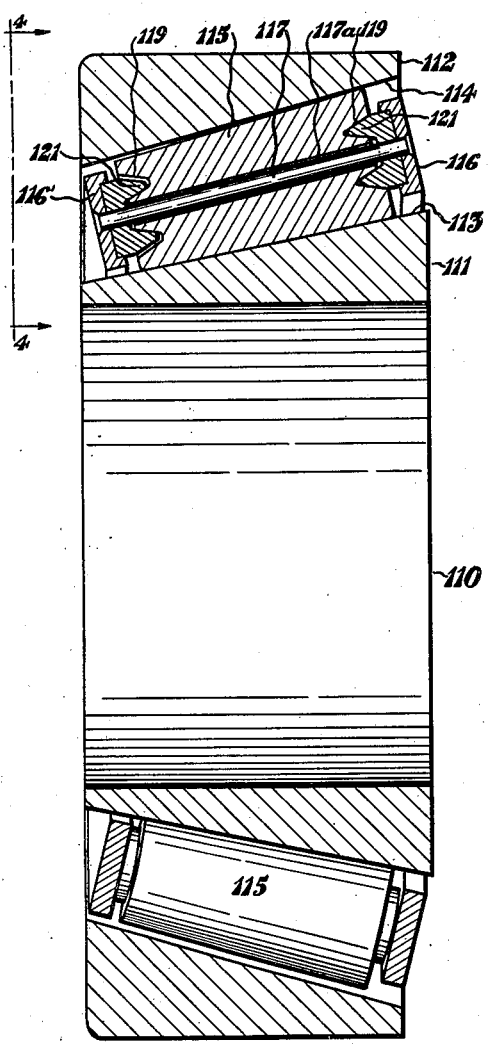
Figure 1:
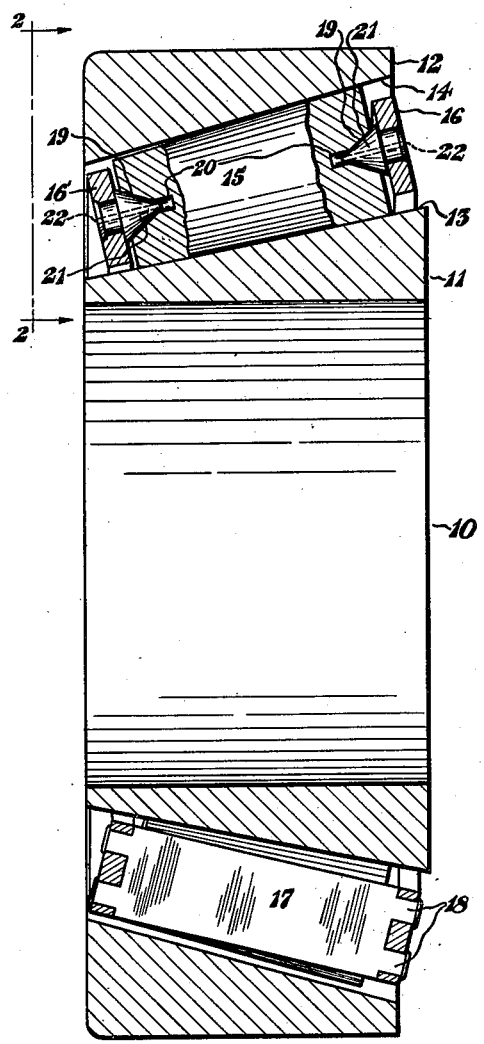
Figure 4:
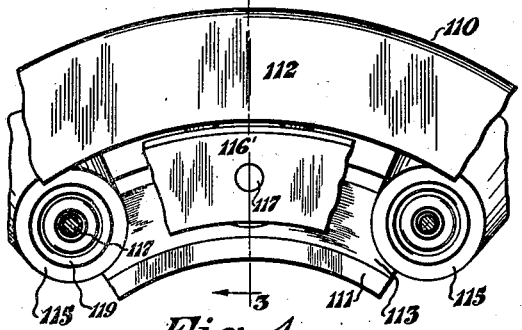
Figure 2:
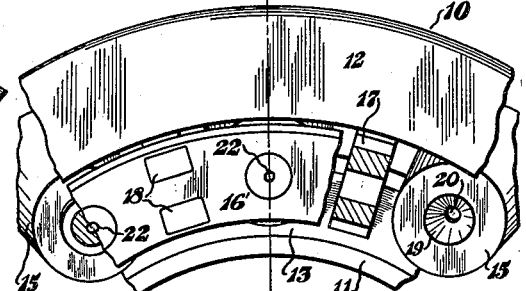
Figure 5:
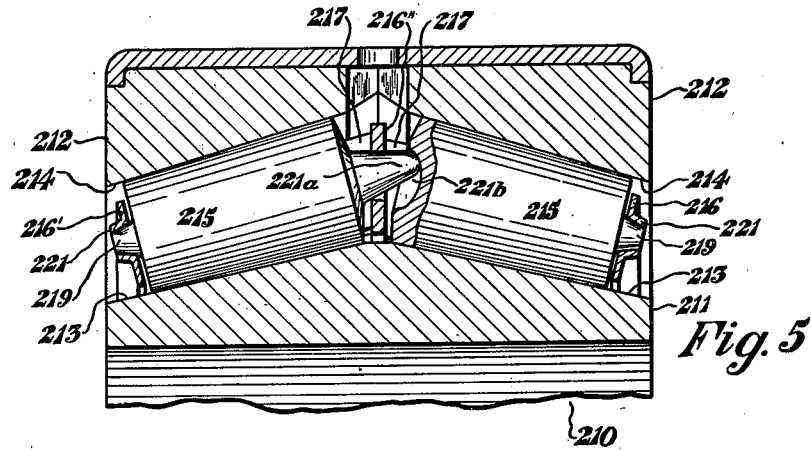
Figure 6:
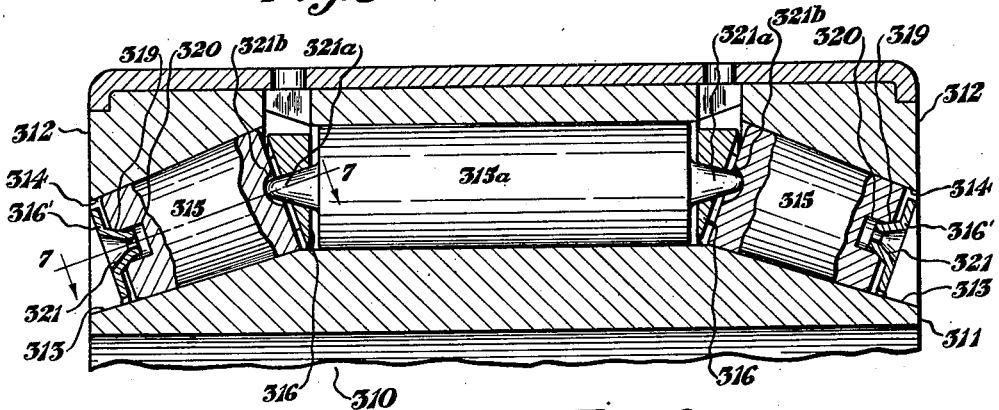
Figure 7:
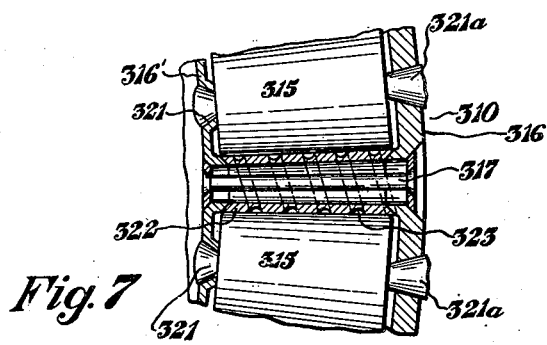

Preferred embodiments of the present improvements are illustrated in the accompanying drawings forming part hereof, in which Figure 1 is an axial cross-section of one form of roller bearing embodying the improvements as on line 1—1, Fig. 2;

Fig. 2, a fragmentary elevation view thereof as on line 2—2, Fig. 1;

Fig. 3, a view similar to Fig. 1 of a modified form of roller bearing embodying the improvements, as on line 3—3, Fig. 4;

Fig. 4, a fragmentary elevation view thereof as on line 4—4, Fig. 3;

Fig. 5, a fragmentary sectional view similar to Figs. 1 and 2 illustrating another form of roller bearing embodying the improvements;

Fig. 6, a view similar to Fig. 5, illustrating another form of roller bearing embodying the improvements;

Fig. 7, a fragmentary sectional view thereof as on line 7—7, Fig. 6; and

Figure 8:
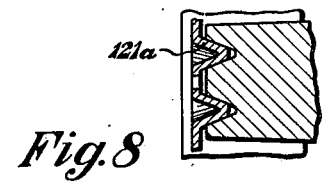

Fig. 8, a fragmentary sectional view illustrating an improved detail of construction for roller bearings embodying the invention.

Similar numerals refer to similar parts throughout the several views.

Several forms of roller bearings embodying the present improvements are indicated generally at 10, 110, 210, and 310, respectively, in Figs. 1 and 2, Figs. 3 and 4, Fig. 5, and Figs. 6 and 7, respectively.

The several roller bearings 10, 110, 210, and 310, include respectively cones 11, 111, 211, and 311, and cups 12, 112, 212, and 312 respectively.

The cones 11, 111, 211, and 311 are each provided, respectively, with one or more outer raceway surfaces 13, 113, 213, and 313; and the cups 12, 112, 212, and 312 are each provided, respectively, with one or more inner raceway surfaces 14, 114, 214, and 314.

Each of the raceway surfaces is limited solely to a conical surface, and does not include any projecting shoulder or flange as it has been customary to provide on the cones and cups of tapered roller bearings for preventing longitudinal axial displacement of the rollers with respect to each other.

Tapered conical rollers 15, 115, 215, and 315 are interposed and roll, respectively, between the sets of opposed raceway surfaces 13 and 14, 113 and 114, 213 and 214, and 313 and 314.

Means independent of the cone and cup are provided in each of the bearings 10, 110, 210, and 310, respectively, for positively maintaining the circumferential positions with respect to each other and the longitudinal axial positions with respect to each other of the rollers 15, 115, 215, and 315, respectively, the positioning means at the same time providing novel bearings mounting the ends of each roller for rotation of the roller thereon about the longitudinal axis of the roller.

Consequently in each bearing, uniform rolling in the raceways of all the circumferentially spaced rollers is attained, and since the circumferential positions with respect to each other and the longitudinal axial positions with respect to each other of the rollers of each bearing is positively maintained, no movement of the rollers axially of the bearing cone is possible.

Any forces tending to cause axial movement of the rollers with respect to the cone are absorbed by reactions in the positive positioning means.

Consequently since no axial movement of the rollers is possible with respect to each other or to the cone, no shoulder is required on the cone for resisting such axial movement, that is to say movements resulting from thrust loads or the thrust components of other types of loads applied to the bearing.

In usual types of roller bearings including a cone and tapered rollers, a cage is provided for circumferentially spacing the several rollers with respect to each other; but slight circumferential and axial displacements of the several rollers with respect to each other is possible due to the clearances between the cage and the rollers, and a protruding shoulder has always been deemed to be necessary to provide on the cone in order to control the longitudinal axial position of the rollers with respect to each other and the cone.

In certain instances a cone without a shoulder has been used in combination with rollers whose circumferential spacing with respect to each other has been fixed, but no means have been provided for preventing longitudinal axial movement of such rollers with respect to each other and to the cone. Consequently surfaces of the rollers and of the circumferential positioning means or cage have been damaged, by reason of the relative longitudinal axial movement of the rollers with respect to the cage.

As aforesaid, the positive bearing positioning means of the present invention overcomes these difficulties and provides a more efficient and durable bearing at less cost.

Several forms of the preferred positive positioning means are illustrated in the bearings 10, 110, 210, and 310, and include, respectively, pairs of strong rigid rings 16 and 16', 116 and 116', 216 and 216', and 316 and 316', interposed between but not touching the respective opposed bearing raceways, the rings being spaced from each other in the direction of the axes of rotation of the bearing cones, and axially extending members 17, 117, 217, and 317 rigidly connecting, respectively, the spaced rings 16 and 16', 116 and 116', 216 and 216', and 316 and 316', the rings and the axially extending members forming strong rigid cages, and the respective rollers of the several bearings being located between the rings in the respective cages with roller ends adjacent the inner surfaces of the rings, and with a positive tapered pivotal bearing between each roller end and the adjacent ring, whereby each roller rotates about its longitudinal axis on its tapered or conical end bearings, but are positively maintained in fixed circumferential spaced positions with respect to each other and in fixed longitudinal axial positions with respect to each other, as aforesaid.

In the roller bearing 10, the axially extending members 17 are in the form of rectangular bars spaced circumferentially of the cone and cup, each end of each bar preferably having a plurality of rivet tongues 18 extending through suitable apertures in the adjacent ring, and secured thereto by riveting over the outer head of each tongues 18.

Also in the roller bearing 10, the positive tapered pivotal engagement between each roller end and the adjacent ring is provided by forming in each end of each roller 15, a conical socket 19 coaxial with the roller and provided at its inner apex end with a cylindric extension well 20 for retaining a lubricant.

Conical centers 21 secured to the rings inwardly extend into and fit the sockets 19, whereby each roller 15 is mounted for rotation between the rigidly positioned conical centers 21.

Each of the centers 21 is preferably provided with an axial lubrication duct 22 providing a communication from the outer end of the center 21 to the inner end thereof extending into the cylindric extension 20 of the conical socket 19.

In the roller bearing 110, the axially extending members 117 are in the form of rods each passing through an axial cylindric opening 117a in each roller 115, each end of each rod passing through a suitable aperture in one of the rings 116 and 116', and being secured thereto as by riveting.

Also in the roller bearing 110, the positive tapered pivotal engagement between each roller end and the adjacent ring is provided by forming in each end of each roller 115 an outwardly opening annular groove 119 having a V-cross-section and coaxial with the roller.

Peripheral V flange centers 121 are secured to the rings and inwardly extend into and fit one or more surfaces of the V grooves 119, whereby each roller 115 is mounted for rotation between the rigidly positioned V flange or double conical centers 121.

The roller bearing 210 includes a double set of rolls 215, and is adapted for resisting thrust loads from either direction. The axially extending members 217 may be in the form of rectangular bars spaced circumferentially between the cone and cup, the outer end of each bar being secured to one of the rings 216 or 216' and the inner end of each bar being secured to a central ring 216''.

In the roller bearing 210, the positive tapered pivotal engagement between each roller end and the adjacent outer ring is provided by forming on each outer end of each roller 215, a conical protuberance 219 coaxial with the roller. Conical sockets 221 are formed in the rings 216 and 216' for receiving and fitting the conical protuberance 221.

A conical protuberance 221a similarly projects from the inner end of one set of the rollers 215 and its outer end extends into and abuts a curved socket 221b in the inner end of the opposite roller of the other set; each inner protuberance 221a passing through a suitable aperture in the central ring 216''.

The rollers 215 are thus mounted for rotation between the rigidly positioned conical sockets 221 in the rings.

The roller bearing 310 includes a double set of tapered rollers 315 between the inner ends of which is interposed a set of cylindric rollers 315a; and this bearing is adapted for resisting thrust loads from either direction and a large radial load.

The axially extending members 317 may be in the form of rods spaced circumferentially between the cone and cup, the outer end of each rod being secured to one of the rings 316' and the inner end of each rod being secured to one of the rings 316.

In the roller bearing 310, the positive tapered pivotal engagement between each roller end and the adjacent outer ring is provided by forming in each outer end of each roller 315, a conical socket 319 coaxial with the roller and provided at its inner apex end with a cylindric extension 320 for retaining a lubricant.

Conical centers 321 are pressed in the rings 316' and extend inwardly into and fit the sockets 319.

A conical protuberance 321a extends outwardly from each end of each cylindric roller 315a into and through a conical aperture in the adjacent ring 316, and into and in abutment with a curved socket 321b in the inner end of the adjacent roller 315.

The rollers 315 are thus mounted for rotation between the rigidly positioned centers 321 and the conical protuberances 321a.

For further strengthening the positive circumferentially spacing means for the rollers 315, as best illustrated in Fig. 7, tubular spacing rollers 322 may be mounted for rotation about rods 317 on conical centers pressed inwardly from the rings 316 and 316', the spacing rollers 322 preferably being provided with a helical oil groove 323.

Fig. 8 illustrates a modified form of V flange center 121a similar to the centers 121 formed by pressing the rings.

As illustrated in the bearings 10 and 110, the apex angle of each of the inner conical surfaces of the cups 12 and 112, is preferably less than that apex angle which would just fit the taper of the rollers 15 and 115, respectively.

In other words the cups 12 and 112, under no load conditions, abut the large end portions of the rollers 15 and 115, respectively, and a slight clearance is provided between the inner conical raceway surfaces of the cups and the smaller ends of the rollers, thereby under loaded conditions varying the load applied on the roller members so that the large ends thereof will carry the greater proportion of the loads applied, and consequently reducing the tendency of the roller members to move bodily towards the large ends of the cones.

Accordingly, it is obvious that in any of the roller bearings 10, 110, 210, and 310, the ring members, being designed with sufficient strength and rigidity, absorb by hoop tension the forces tending to move the roller members longitudinal of the cone axis, due to the fact that the roller members are positively positioned between the ring members as aforesaid.

I claim:

1. A roller bearing including a cone having an outer raceway surface, a cup having an inner raceway surface, tapered rollers interposed between and rolling on the raceway surfaces of the cone and cup, each raceway surface being limited to a conical surface, and one of the raceway surfaces under no load conditions abutting end portions only of the rollers, and a rigid cage independent of the cone and cup, the cage including spaced end rings, circumferentially spaced conical centers secured to each ring and extending towards the opposite ring, and each roller having formed in each end thereof a conical socket, and opposite conical centers fitting in the opposite end sockets of one of the rollers and mounting the roller for rotation on the centers, the rollers being longitudinally stationary with respect to the conical centers.

2. A roller bearing including a cone having an outer raceway surface, a cup having an inner raceway surface, tapered rollers interposed between and rolling on the raceway surfaces of the cone and cup, each raceway surface being limited to a single conical surface, and one of the raceway surfaces under no load conditions abutting portions at one end only of each roller.

3. A roller bearing including a cone having an outer raceway surface, a cup having an inner raceway surface, tapered rollers interposed between and rolling on the raceway surfaces of the cone and cup, and one of the raceway surfaces under no load conditions abutting end portions only of the rollers, and a rigid cage independent of the cone and cup, the cage including spaced end rings, circumferentially spaced conical centers secured to each ring and extending towards the opposite ring, and each roller having formed in each end thereof a conical socket and a well extending from the inner apex of the socket, and opposite pairs of the conical centers fitting in the opposite end sockets of each roller and mounting the roller for rotation on the centers, the rollers being longitudinally stationary with respect to the conical centers.

4. A roller bearing including a cone having an outer raceway surface, a cup having an inner raceway surface, tapered rollers interposed between and rolling on the raceway surfaces of the cone and cup, each raceway surface being limited to a conical surface, and a rigid cage independent of the cone and cup, the cage including spaced end rings, circumferentially spaced conical centers secured to each ring and extending towards the opposite ring, and each roller having formed in each end thereof a conical socket, and opposite conical centers fitting in the opposite end sockets of one of the rollers and mounting the roller for rotation on the centers, and a lubricating duct formed in each center and extending between the opposite ends thereof.

5. A roller bearing including a cone having an outer raceway surface, a cup having an inner raceway surface, tapered rollers interposed between and rolling on the raceway surfaces of the cone and cup, each raceway surface being limited to a conical surface, and one of the raceway surfaces under no load conditions abutting end portions only of the rollers, and a rigid cage independent of the cone and cup, the cage including spaced end rings, circumferentially spaced conical centers secured to each ring and extending towards the opposite ring, and each roller having formed in each end thereof a conical socket, and opposite conical centers fitting in the opposite end sockets of one of the rollers and mounting the roller for rotation on the centers, and a lubricating duct formed in each center and extending between the opposite ends thereof.

6. A roller bearing including a cone having an outer raceway surface, a cup having an inner raceway surface, tapered rollers interposed between and rolling on the raceway surfaces of the cone and cup, and one of the raceway surfaces under no load conditions abutting end portions only of the rollers, and a rigid cage independent of the cone and cup, the cage including spaced end rings, circumferentially spaced conical centers secured to each ring and extending towards the opposite ring, and each roller having formed in each end thereof a conical socket and a well extending from the inner apex of the socket, and opposite pairs of the conical centers fitting in the opposite end sockets of each roller and mounting the roller for rotation on the centers, and a lubricating duct formed in each center and extending between the opposite ends thereof.

7. A roller bearing including a cone having an outer raceway surface, a cup having an inner raceway surface, tapered rollers interposed between and rolling on the raceway surfaces of the cone and cup, and a rigid cage independent of the cone and cup, the cage including spaced end rings, circumferentially spaced conical centers secured to each ring and extending towards the opposite ring, and each roller having formed in each end thereof a conical socket and a well extending from the inner apex of the socket, and opposite conical centers fitting in the opposite end sockets of one of the rollers and mounting the roller for rotation on the centers, and a lubricating duct formed in each center and extending between the opposite ends thereof.

8. A roller bearing including a cone having an outer raceway surface, a cup having an inner raceway surface, tapered rollers interposed between and rolling on the raceway surfaces of the cone and cup, each raceway surface being limited to a conical surface, and one of the raceway surfaces under no load conditions abutting end portions only of the rollers, and means independent of the cone and cup permitting rotation of the rollers and positively maintaining their positions with respect to each other and including spaced rigid rings, rigid members extending between the rings and connected therewith, and the rollers being positioned between the rings, and conical pivotal engaging means between each end of each roller and the adjacent ring.

In testimony that I claim the above, I have hereunto subscribed my name.

NICHOLAS MEDVED.